(12) United States Patent
Sun et al.

(10) Patent No.: US 10,730,798 B2
(45) Date of Patent: Aug. 4, 2020

(54) SLURRY PLASMA SPRAY OF PLASMA RESISTANT CERAMIC COATING

(71) Applicant: Applied Materials, Inc., Santa Clara, CA (US)

(72) Inventors: Jennifer Sun, Mountain View, CA (US); Biraja Prasad Kanungo, San Jose, CA (US); Yikai Chen, Santa Clara, CA (US); Vahid Firouzdor, San Mateo, CA (US)

(73) Assignee: Applied Materials, Inc., Santa Clara, CA (US)

( * ) Notice: Subject to any disclaimer, the term of this patent is extended or adjusted under 35 U.S.C. 154(b) by 354 days.

(21) Appl. No.: 14/704,742

(22) Filed: May 5, 2015

(65) Prior Publication Data

US 2015/0321964 A1    Nov. 12, 2015

Related U.S. Application Data

(60) Provisional application No. 61/989,903, filed on May 7, 2014.

(51) Int. Cl.
*C23C 4/02* (2006.01)
*C23C 4/04* (2006.01)
(Continued)

(52) U.S. Cl.
CPC .............. *C04B 35/10* (2013.01); *C04B 35/16* (2013.01); *C04B 35/44* (2013.01); *C04B 35/486* (2013.01); *C04B 35/4885* (2013.01); *C04B 35/50* (2013.01); *C04B 35/505* (2013.01); *C04B 35/5156* (2013.01); *C23C 4/02* (2013.01); *C23C 4/04* (2013.01); *C23C 4/11* (2016.01); *C23C 4/127* (2013.01); *C23C 4/18* (2013.01); *C23C 24/103* (2013.01); *C23C 28/042* (2013.01);
(Continued)

(58) Field of Classification Search
CPC .. C23C 4/11; C23C 4/134; C23C 4/18; C04B 35/505; C04B 35/48
USPC .................................................. 427/446–456
See application file for complete search history.

(56) References Cited

U.S. PATENT DOCUMENTS 4,695,439 A    9/1987 Ritski et al.
4,773,928 A    9/1988 Houck et al.
(Continued)

FOREIGN PATENT DOCUMENTS

JP    2010150617    7/2010
JP    2014062332    4/2014
(Continued)

OTHER PUBLICATIONS

Notification of Transmittal of the International Search Report and the Written Opinion of the International Searching Authority or the Declaration, dated Jul. 31, 2015, 11 pages.
(Continued)

*Primary Examiner* — Dah-Wei D. Yuan
*Assistant Examiner* — Nga Leung V Law
(74) *Attorney, Agent, or Firm* — Lowenstein Sandler LLP

(57) ABSTRACT

Disclosed herein are methods for producing an ultra-dense and ultra-smooth ceramic coating. A method includes feeding a slurry of ceramic particles into a plasma sprayer. The plasma sprayer generates a stream of particles directed toward the substrate, forming a ceramic coating on the substrate upon contact.

20 Claims, 5 Drawing Sheets

(51) Int. Cl.

| | | |
|---|---|---|
| C23C 4/10 | (2016.01) | |
| C04B 35/10 | (2006.01) | |
| C04B 35/515 | (2006.01) | |
| C23C 4/12 | (2016.01) | |
| C23C 4/18 | (2006.01) | |
| C23C 24/10 | (2006.01) | |
| C23C 28/04 | (2006.01) | |
| C23C 4/11 | (2016.01) | |
| C04B 35/488 | (2006.01) | |
| C04B 35/505 | (2006.01) | |
| C04B 35/44 | (2006.01) | |
| C04B 35/50 | (2006.01) | |
| C04B 35/486 | (2006.01) | |
| C04B 35/16 | (2006.01) | |

(52) U.S. Cl.
CPC ............ C04B 2235/3217 (2013.01); C04B 2235/3224 (2013.01); C04B 2235/3225 (2013.01); C04B 2235/3244 (2013.01); C04B 2235/3418 (2013.01); Y10T 428/24372 (2015.01)

(56) References Cited

U.S. PATENT DOCUMENTS

| | | |
|---|---|---|
| 7,112,758 B2 | 9/2006 | Ma |
| 7,479,464 B2 | 1/2009 | Sun et al. |
| 7,655,328 B2 | 2/2010 | Maeda et al. |
| 7,672,110 B2 | 3/2010 | Sun et al. |
| 7,696,117 B2 | 4/2010 | Sun et al. |
| 7,968,205 B2 | 6/2011 | Nakano et al. |
| 8,034,734 B2 | 10/2011 | Sun et al. |
| 8,067,067 B2 | 11/2011 | Sun et al. |
| 8,129,029 B2 | 3/2012 | Sun et al. |
| 8,206,829 B2 | 6/2012 | Sun et al. |
| 8,367,227 B2 | 2/2013 | Sun et al. |
| 8,619,406 B2 | 12/2013 | Cho et al. |
| 8,758,858 B2 | 6/2014 | Sun et al. |
| 8,941,969 B2 | 1/2015 | Thach et al. |
| 9,034,199 B2 | 5/2015 | Duan et al. |
| 9,090,046 B2 | 7/2015 | Sun et al. |
| 9,212,099 B2 | 12/2015 | Sun et al. |
| 9,230,780 B2 | 1/2016 | Cox et al. |
| 9,583,369 B2 | 2/2017 | Sun et al. |
| 9,711,334 B2 | 7/2017 | Sun et al. |
| 2002/0031658 A1 | 3/2002 | Chow et al. |
| 2003/0017350 A1* | 1/2003 | Takai .............. B32B 18/00 428/472 |
| 2003/0047464 A1 | 3/2003 | Sun et al. |
| 2003/0049500 A1* | 3/2003 | Takai .............. C04B 35/44 428/702 |
| 2003/0164354 A1 | 9/2003 | Hsieh et al. |
| 2004/0226508 A1 | 11/2004 | Ma et al. |
| 2004/0229031 A1 | 11/2004 | Gell et al. |
| 2005/0037193 A1 | 2/2005 | Sun et al. |
| 2005/0136188 A1 | 6/2005 | Chang |
| 2006/0222777 A1 | 10/2006 | Skoog et al. |
| 2007/0047170 A1 | 3/2007 | Sun et al. |
| 2008/0029032 A1 | 2/2008 | Sun et al. |
| 2008/0100228 A1 | 5/2008 | Park |
| 2008/0108225 A1 | 5/2008 | Sun et al. |
| 2008/0213496 A1* | 9/2008 | Sun .............. C23C 4/18 427/453 |
| 2008/0236744 A1* | 10/2008 | Furuse ............ H01J 37/32477 156/345.1 |
| 2008/0264564 A1 | 10/2008 | Sun et al. |
| 2008/0264565 A1 | 10/2008 | Sun et al. |
| 2008/0268171 A1 | 10/2008 | Ma et al. |
| 2009/0036292 A1 | 2/2009 | Sun et al. |
| 2009/0162647 A1 | 6/2009 | Sun et al. |
| 2009/0214825 A1* | 8/2009 | Sun .............. C23C 4/11 428/141 |
| 2009/0241496 A1* | 10/2009 | Pintault ............ B01D 67/0048 55/524 |
| 2009/0324916 A1* | 12/2009 | Hamaya ............ C23C 4/06 428/220 |
| 2010/0107982 A1* | 5/2010 | Sato .............. C23C 4/00 118/726 |
| 2010/0119843 A1 | 5/2010 | Sun et al. |
| 2010/0129670 A1 | 5/2010 | Sun et al. |
| 2010/0160143 A1 | 6/2010 | Sun et al. |
| 2010/0320176 A1* | 12/2010 | Mohanty ............ H05H 1/42 219/121.37 |
| 2011/0086178 A1* | 4/2011 | Ruud .............. C23C 4/11 427/447 |
| 2011/0129684 A1 | 6/2011 | Okamoto et al. |
| 2011/0135915 A1 | 6/2011 | Lee et al. |
| 2011/0198034 A1 | 8/2011 | Sun et al. |
| 2012/0034469 A1 | 2/2012 | Sun et al. |
| 2012/0074514 A1 | 3/2012 | Nguyen et al. |
| 2012/0104703 A1 | 5/2012 | Sun et al. |
| 2012/0125488 A1 | 5/2012 | Sun et al. |
| 2012/0141661 A1 | 6/2012 | Cho et al. |
| 2012/0144640 A1 | 6/2012 | Shih et al. |
| 2012/0154916 A1 | 6/2012 | Nishimoto et al. |
| 2012/0183790 A1* | 7/2012 | Petorak ............ C04B 35/488 428/450 |
| 2012/0196139 A1 | 8/2012 | Petorak et al. |
| 2012/0237745 A1 | 9/2012 | Dierkes et al. |
| 2013/0048606 A1 | 2/2013 | Mao et al. |
| 2013/0071685 A1 | 3/2013 | Iwaki et al. |
| 2013/0130052 A1 | 5/2013 | Menuey et al. |
| 2013/0156958 A1 | 6/2013 | Belov et al. |
| 2013/0174983 A1 | 7/2013 | Kikuchi et al. |
| 2013/0216783 A1 | 8/2013 | Duan et al. |
| 2013/0216821 A1 | 8/2013 | Sun et al. |
| 2013/0224457 A1 | 8/2013 | Lee |
| 2013/0224498 A1 | 8/2013 | Sun et al. |
| 2013/0273313 A1 | 10/2013 | Sun et al. |
| 2013/0273327 A1 | 10/2013 | Sun et al. |
| 2013/0284373 A1 | 10/2013 | Sun et al. |
| 2013/0288037 A1 | 10/2013 | Sun et al. |
| 2013/0333592 A1 | 12/2013 | Nakagawa et al. |
| 2014/0030486 A1 | 1/2014 | Sun et al. |
| 2014/0030533 A1 | 1/2014 | Sun et al. |
| 2014/0037969 A1 | 2/2014 | Margolies et al. |
| 2014/0154465 A1 | 6/2014 | Sun et al. |
| 2014/0178641 A1* | 6/2014 | Leblanc ............ C23C 4/18 428/143 |
| 2014/0349073 A1 | 11/2014 | Sun et al. |
| 2014/0363596 A1 | 12/2014 | Sun et al. |
| 2014/0377504 A1 | 12/2014 | Sun et al. |
| 2015/0021324 A1 | 1/2015 | Sun et al. |
| 2015/0024155 A1 | 1/2015 | Sun et al. |
| 2015/0044444 A1 | 2/2015 | Gell |
| 2015/0064406 A1 | 3/2015 | Harada et al. |
| 2015/0075714 A1 | 3/2015 | Sun et al. |
| 2015/0079370 A1 | 3/2015 | Sun et al. |
| 2015/0126036 A1 | 5/2015 | Zhao |
| 2015/0133285 A1 | 5/2015 | Sun et al. |
| 2015/0147527 A1 | 5/2015 | Gell |
| 2015/0152540 A1 | 6/2015 | Sato et al. |
| 2015/0158775 A1 | 6/2015 | Sun et al. |
| 2015/0218057 A1 | 8/2015 | Duan et al. |
| 2015/0270108 A1 | 9/2015 | Sun et al. |
| 2015/0299050 A1 | 10/2015 | Sun et al. |
| 2015/0307982 A1 | 10/2015 | Firouzdor et al. |
| 2015/0311043 A1 | 10/2015 | Sun et al. |
| 2015/0311044 A1 | 10/2015 | Sun et al. |
| 2015/0321964 A1 | 11/2015 | Sun et al. |
| 2015/0329430 A1 | 11/2015 | Sun et al. |
| 2015/0329955 A1 | 11/2015 | Sun et al. |
| 2016/0016856 A1 | 1/2016 | Kitamura et al. |
| 2016/0042924 A1 | 2/2016 | Kim et al. |
| 2016/0060181 A1 | 3/2016 | Sun et al. |
| 2016/0211121 A1 | 7/2016 | Sun et al. |
| 2016/0326625 A1 | 11/2016 | Sun et al. |
| 2017/0022595 A1 | 1/2017 | Sato et al. |
| 2017/0088928 A1 | 3/2017 | Ibe et al. |
| 2017/0107604 A1 | 4/2017 | Ibe et al. |
| 2017/0130319 A1 | 5/2017 | Sun et al. |

(56) References Cited

U.S. PATENT DOCUMENTS

2017/0133207 A1 5/2017 Sun et al.
2017/0291856 A1 10/2017 Sun et al.
2017/0301522 A1 10/2017 Sun et al.
2018/0010234 A1 1/2018 Sun et al.
2018/0010235 A1 1/2018 Sun et al.
2018/0096825 A1 4/2018 Sun et al.
2018/0100228 A1 4/2018 Sun et al.
2018/0105922 A1 4/2018 Sun et al.

FOREIGN PATENT DOCUMENTS

| JP | 2014122418 | 7/2014 |
| JP | 2015227512 | 12/2015 |
| JP | 2016089241 | 5/2016 |
| KR | 20170044396 | 4/2017 |

OTHER PUBLICATIONS

Tania Bhatia et al., "Mechanisms of ceramic coating deposition in solution-precursor plasma spray", J. Mater. Res., vol. 17, No. 9, Sep. 2002 (10 pages).

Bhatia, Tania et al. "Mechanisms of ceramic coating deposition in solution-precursor plasma spray", J. Mater Res., vol. 17, No. 9, Sep. 2002 (10 pages).

Darthout et al., "Lu2O3—SiO2—ZrO2 Coatings for Environmental Barrier Application by Solution Precursor Plasma Spraying and Influence of Precursor Chemistry" Journal of Thermal Spray Technology, vol. 23(3) Feb. 2014, pp. 325-332.

International Search Report and Written Opinion of the International Searching Authority dated Aug. 18, 2017 in International Application No. PCT/US2017/026164.

\* cited by examiner

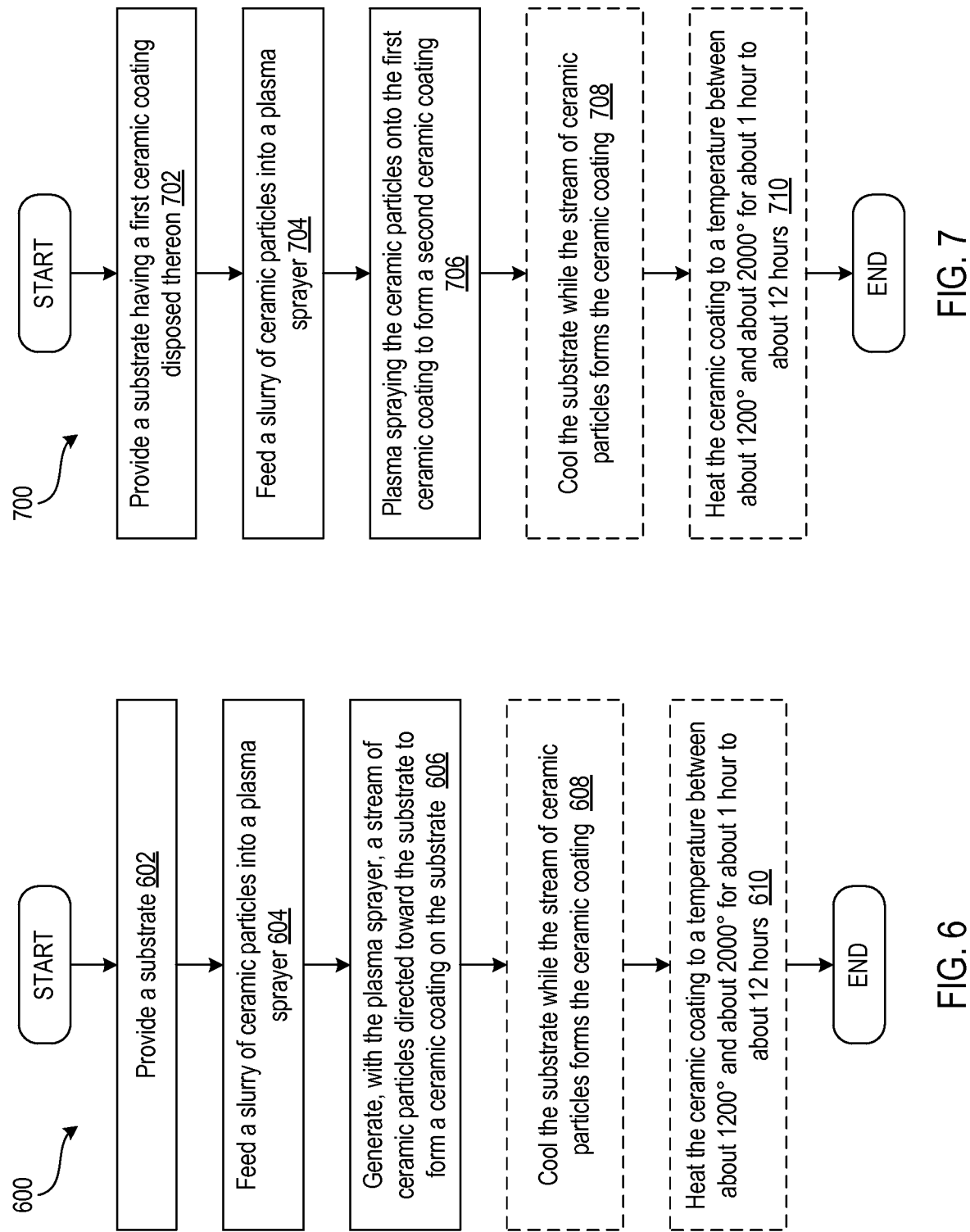

SLURRY PLASMA SPRAY OF PLASMA RESISTANT CERAMIC COATING

CROSS-REFERENCE TO RELATED APPLICATION

This application claims the benefit of priority of U.S. Provisional Patent Application No. 61/989,903, filed May 7, 2014.

TECHNICAL FIELD

Embodiments of the present invention relate, in general, to coatings.

BACKGROUND

In the semiconductor industry, devices are fabricated by a number of manufacturing processes producing structures of ever-decreasing size. Some manufacturing processes such as plasma etch and plasma clean processes expose a substrate support (e.g., an edge of the substrate support during wafer processing and the full substrate support during chamber cleaning) to a high-speed stream of plasma to etch or clean the substrate. The plasma may be highly corrosive, and may corrode processing chambers and other surfaces that are exposed to the plasma.

Plasma spray coatings are utilized to protect chamber components from processing conditions, in order to enhance on-wafer defect performance as well as the lifetime of the component. Typical chamber component coatings, however, can have inherent porosity, cracks, and rough surface finishes, which detract from their performance.

SUMMARY

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

Certain embodiments of the present disclosure relate to the production of ultra-dense and ultra-smooth coatings with enhanced defect performance for semiconductor processing chambers. In one aspect, a method includes providing a substrate, feeding a slurry of ceramic particles into a plasma plume to generate a stream of particles directed toward the substrate. The stream of particles forms a ceramic coating on the substrate upon contact.

In another aspect, a method includes providing a substrate having a first ceramic coating, feeding a slurry of ceramic particles into a plasma plume to generate a stream of particles directed toward the substrate. The stream of particles forms a second ceramic coating on the first ceramic coating upon contact.

BRIEF DESCRIPTION OF THE DRAWINGS

The embodiments disclosed herein are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 6 is a flow diagram illustrating a process for producing a coating in accordance with an embodiment; and FIG. 7 is a flow diagram illustrating a process for producing a multilayered coating in accordance with an embodiment.

DETAILED DESCRIPTION OF EMBODIMENTS

Embodiments of the present invention provide a substrate, such as a chamber component for a semiconductor processing chamber. The ceramic coating may be formed on the substrate using slurry plasma spray deposition. The ceramic coating may serve as a protective coating. In some embodiments, a coating stack may be deposited on the substrate, in which the coating stack is composed of two or more slurry plasma sprayed ceramic coatings. In such embodiments, each ceramic coating may be between about 10 micrometers to about 500 micrometers in thickness. Each ceramic coating may have a composition of one or more of $Y_3Al_5O_{12}$ (YAG), $Y_4Al_2O_9$ (YAM), $Er_2O_3$, $Gd_2O_3$, $Gd_3Al_5O_{12}$ (GAG), $YF_3$, $Nd_2O_3$, $Er_4Al_2O_9$, $Er_3Al_5O_{12}$ (EAG), $ErAlO_3$, $Gd_4Al_2O_9$, $GdAlO_3$, $Nd_3Al_5O_{12}$, $Nd_4Al_2O_9$, $NdAlO_3$, or a ceramic compound composed of $Y_4Al_2O_9$ and a solid-solution of $Y_2O_3$—$ZrO_2$. The improved erosion resistance provided by one or more of the disclosed ceramic coatings may improve the service life of the chamber component, while reducing maintenance and manufacturing cost.

Figure 1:
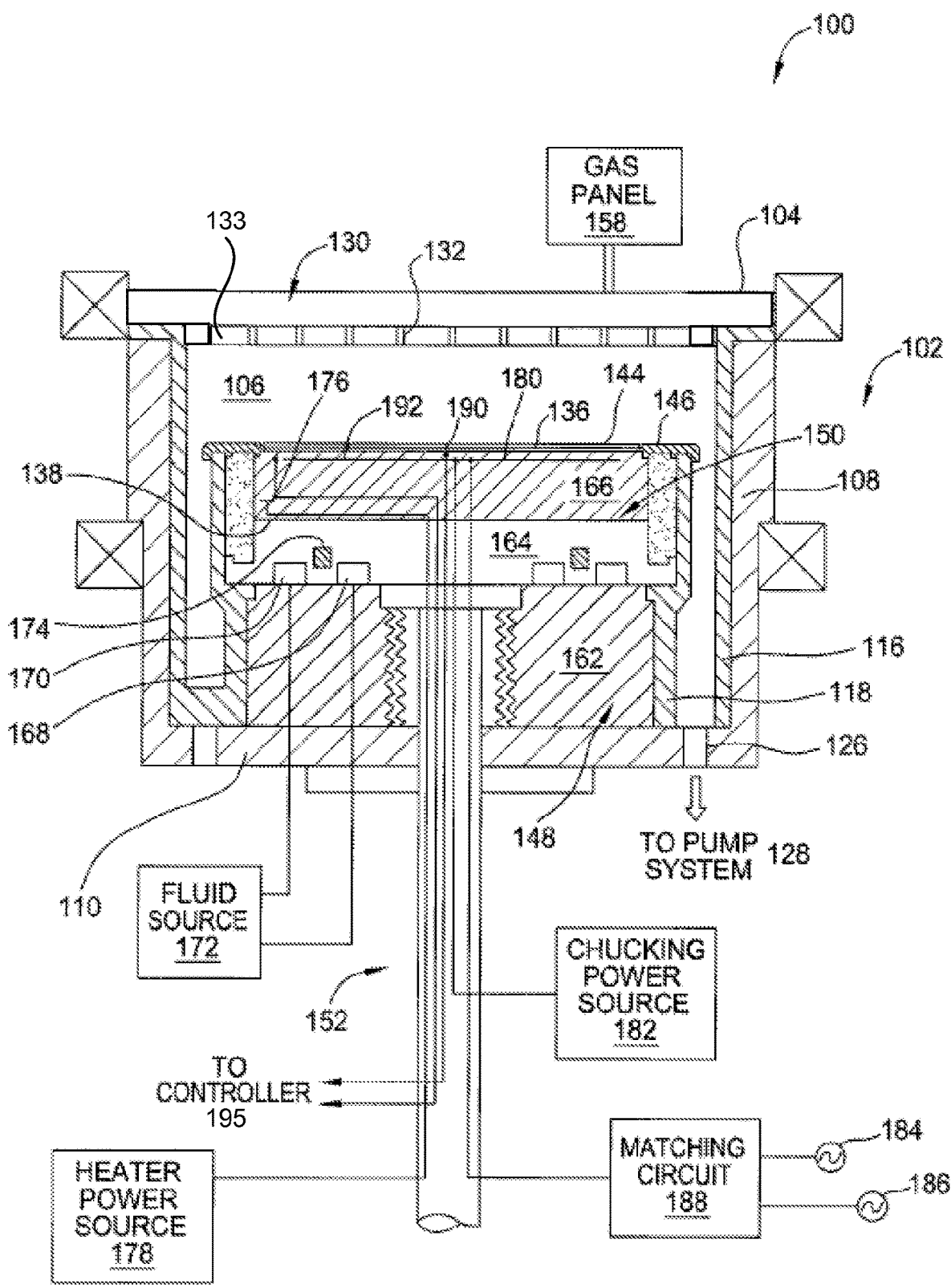
FIG. 1 depicts a sectional view of a processing chamber according to an embodiment.

FIG. 1 is a sectional view of a semiconductor processing chamber 100 having one or more chamber components that are coated with a coating layer in accordance with embodiments of the present invention. The processing chamber 100 may be used for processes in which a corrosive plasma environment is provided. For example, the processing chamber 100 may be a chamber for a plasma etcher or plasma etch reactor, a plasma cleaner, and so forth. Examples of chamber components that may include a coating layer include a substrate support assembly 148, an electrostatic chuck (ESC) 150, a ring (e.g., a process kit ring or single ring), a chamber wall, a base, a gas distribution plate, a showerhead, a liner, a liner kit, a shield, a plasma screen, a flow equalizer, a cooling base, a chamber viewport, a chamber lid, and so on. The coating layer, which is described in greater detail below, may include one or more $Y_3Al_5O_{12}$, $Y_4Al_2O_9$, $Er_2O_3$, $Gd_2O_3$, $Gd_3Al_5O_{12}$, $La_2O_3$, YAG, $YF_3$, $Nd_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, $NdAlO_{39}$ or a ceramic compound composed of $Y_4Al_2O_9$ and a solid-solution of $Y_2O_3$—$ZrO_2$. As illustrated, the substrate support assembly 148 has a ceramic coating layer 136, in accordance with one embodiment. However, it should be understood that any of the other chamber components, such as those listed above, may also include a coating layer.

In one embodiment, the processing chamber 100 includes a chamber body 102 and a showerhead 130 that enclose an interior volume 106. Alternatively, the showerhead 130 may be replaced by a lid and a nozzle in some embodiments. The chamber body 102 may be fabricated from aluminum, stainless steel or other suitable material. The chamber body 102 generally includes sidewalls 108 and a bottom 110. One or more of the showerhead 130 (or lid and/or nozzle), sidewalls 108 and/or bottom 110 may include a coating layer.

An outer liner 116 may be disposed adjacent the sidewalls 108 to protect the chamber body 102. The outer liner 116 may be fabricated and/or coated with a coating layer. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 100.

The showerhead 130 may be supported on the sidewall 108 of the chamber body 102. The showerhead 130 (or lid) may be opened to allow access to the interior volume 106 of the processing chamber 100, and may provide a seal for the processing chamber 100 while closed. A gas panel 158 may be coupled to the processing chamber 100 to provide process and/or cleaning gases to the interior volume 106 through the showerhead 130 or lid and nozzle. Showerhead 130 may be used for processing chambers used for dielectric etch (etching of dielectric materials). The showerhead 130 includes a gas distribution plate (GDP) 133 having multiple gas delivery holes 132 throughout the GDP 133. The showerhead 130 may include the GDP 133 bonded to an aluminum base or an anodized aluminum base 104. The GDP 133 may be made from Si or SiC, or may be a ceramic such as $Y_2O_3$, $Al_2O_3$, YAG, and so forth.

For processing chambers used for conductor etch (etching of conductive materials), a lid may be used rather than a showerhead. The lid may include a center nozzle that fits into a center hole of the lid. The lid may be a ceramic such as $Al_2O_3$, $Y_2O_3$, YAG, or a ceramic compound composed of $Y_4Al_2O_9$ and a solid-solution of $Y_2O_3$—$ZrO_2$. The nozzle may also be a ceramic, such as $Y_2O_3$, YAG, or the ceramic compound composed of $Y_4Al_2O_9$ and a solid-solution of $Y_2O_3$—$ZrO_2$. The lid, showerhead base 104, GDP 133 and/or nozzle may be coated with a ceramic coating.

Examples of processing gases that may be used to process substrates in the processing chamber 100 include halogen-containing gases, such as $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. Examples of carrier gases include $N_2$, He, Ar, and other gases inert to process gases (e.g., non-reactive gases). The substrate support assembly 148 is disposed in the interior volume 106 of the processing chamber 100 below the showerhead 130 or lid. The substrate support assembly 148 holds the substrate 144 during processing. A ring 146 (e.g., a single ring) may cover a portion of the electrostatic chuck 150, and may protect the covered portion from exposure to plasma during processing. The ring 146 may be silicon or quartz in one embodiment.

An inner liner 118 may be coated on the periphery of the substrate support assembly 148. The inner liner 118 may be a halogen-containing gas resistant material such as those discussed with reference to the outer liner 116. In one embodiment, the inner liner 118 may be fabricated from the same materials of the outer liner 116. Additionally, the inner liner 118 may be coated with a ceramic coating.

In one embodiment, the substrate support assembly 148 includes a mounting plate 162 supporting a pedestal 152, and an electrostatic chuck 150. The electrostatic chuck 150 further includes a thermally conductive base 164 and an electrostatic puck 166 bonded to the thermally conductive base by a bond 138, which may be a silicone bond in one embodiment. An upper surface of the electrostatic puck 166 is covered by the ceramic coating layer 136 in the illustrated embodiment. In one embodiment, the ceramic coating layer 136 is disposed on the upper surface of the electrostatic puck 166. In another embodiment, the ceramic coating layer 136 is disposed on the entire exposed surface of the electrostatic chuck 150 including the outer and side periphery of the thermally conductive base 164 and the electrostatic puck 166. The mounting plate 162 is coupled to the bottom 110 of the chamber body 102 and includes passages for routing utilities (e.g., fluids, power lines, sensor leads, etc.) to the thermally conductive base 164 and the electrostatic puck 166.

The thermally conductive base 164 and/or electrostatic puck 166 may include one or more optional embedded heating elements 176, embedded thermal isolators 174 and/or conduits 168, 170 to control a lateral temperature profile of the support assembly 148. The conduits 168, 170 may be fluidly coupled to a fluid source 172 that circulates a temperature regulating fluid through the conduits 168, 170. The embedded isolator 174 may be disposed between the conduits 168, 170 in one embodiment. The heater 176 is regulated by a heater power source 178. The conduits 168, 170 and heater 176 may be utilized to control the temperature of the thermally conductive base 164, thereby heating and/or cooling the electrostatic puck 166 and a substrate (e.g., a wafer) 144 being processed. The temperature of the electrostatic puck 166 and the thermally conductive base 164 may be monitored using a plurality of temperature sensors 190, 192, which may be monitored using a controller 195.

The electrostatic puck 166 may further include multiple gas passages such as grooves, mesas and other surface features, which may be formed in an upper surface of the puck 166 and/or the ceramic coating layer 136. The gas passages may be fluidly coupled to a source of a heat transfer (or backside) gas such as helium via holes drilled in the puck 166. In operation, the backside gas may be provided at controlled pressure into the gas passages to enhance the heat transfer between the electrostatic puck 166 and the substrate 144. The electrostatic puck 166 includes at least one clamping electrode 180 controlled by a chucking power source 182. The electrode 180 (or other electrode disposed in the puck 166 or base 164) may further be coupled to one or more RF power sources 184, 186 through a matching circuit 188 for maintaining a plasma formed from process and/or other gases within the processing chamber 100. The sources 184, 186 are generally capable of producing an RF signal having a frequency from about 50 kHz to about 3 GHz, with a power output of up to about 10,000 Watts.

Figure 2:
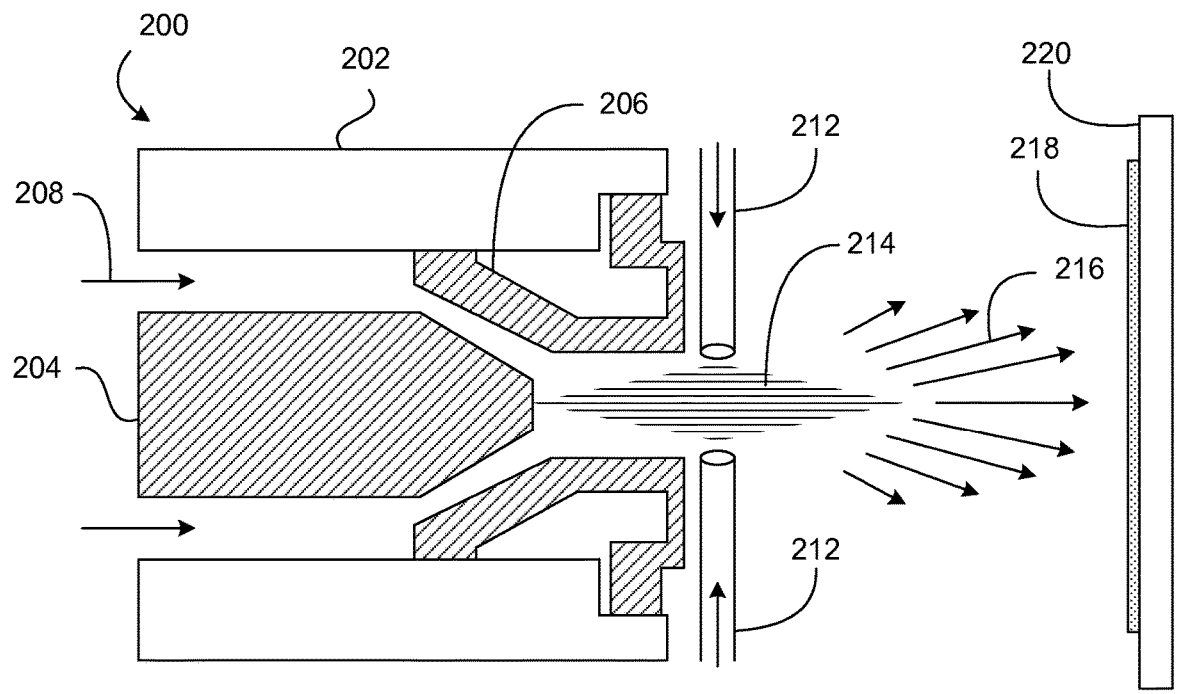
FIG. 2 depicts a sectional view of a plasma spray device according to an embodiment.

FIG. 2 depicts a sectional view of a plasma spray device 200 according to an embodiment. The plasma spray device 200 is a type of thermal spray system that is used to perform "slurry plasma spray" ("SPS") deposition of ceramic materials. Unlike standard plasma spray techniques, SPS deposition utilizes a solution-based distribution of particles (a slurry) to deposit a ceramic coating on a substrate. The SPS may be performed by spraying the slurry using atmospheric plasma spray, high velocity oxy-fuel (HVOF), warm spraying, vacuum plasma spraying (VPS), and low pressure plasma spraying (LPPS).

The plasma spray device 200 may include a casing 202 that encases a nozzle anode 206 and a cathode 204. The casing 202 permits gas flow 208 through the plasma spray device 200 and between the nozzle anode 206 and the cathode 204. An external power source may be used to apply a voltage potential between the nozzle anode 206 and the cathode 204. The voltage potential produces an arc between the nozzle anode 206 and the cathode 204 that ignites the gas flow 208 to produce a plasma gas. The ignited plasma gas flow 208 produces a high-velocity plasma plume 214 that is directed out of the nozzle anode 206 and toward a substrate 220. A distance between a distal end of the nozzle anode 206 and the substrate 220 (i.e., a gun distance) may be between about 50 mm and about 500 mm.

The plasma spray device 200 may be located in a chamber or atmospheric booth. In some embodiments, the gas flow 208 may be a gas or gas mixture including, but not limited to, argon, nitrogen, hydrogen, helium, and combinations thereof. A flow rate of the gas flow 208 may be between about 50 L/min and 400 L/min. A voltage potential applied between the nozzle anode 206 and the cathode 204 may be an AC waveform, a DC waveform, or a combination thereof, and may be between about 40 V and about 500 V. The applied potential is generally capable of providing a gun power of 30 kW or greater with a gun current of up to 1000 A or greater.

The plasma spray device 200 may be equipped with one or more fluid lines 212 to deliver a slurry into the plasma plume 214, for example, at a flow rate between 5 mL/min and about 100 mL/min. In some embodiments, several fluid lines 212 may be arranged on one side or symmetrically around the plasma plume 214. In some embodiments, the fluid lines 212 may be arranged in a perpendicular fashion to the plasma plume 214 direction, as depicted in FIG. 2. In other embodiments, the fluid lines 212 may be adjusted to deliver the slurry into the plasma plume at a different angle (e.g., 45°), or may be located at least partially inside of the casing 202 to internally inject the slurry into the plasma plume 214. In some embodiments, each fluid line 212 may provide a different slurry, which may be utilized to vary a composition of a resulting coating across the substrate 220.

A slurry feeder system may be utilized to deliver the slurry to the fluid lines 212. In some embodiments, the slurry feeder system includes a flow controller that maintains a constant flow rate during coating. The fluid lines 212 may be cleaned before and after the coating process using, for example, de-ionized water. In some embodiments, a slurry container, which contains the slurry fed to the plasma spray device 200, is mechanically agitated during the course of the coating process keep the slurry uniform and prevent settling.

In some embodiments, the slurry is a slurry of ceramic particles within a solvent. The solvent may include a low molecular weight polar solvent, including, but not limited to, ethanol, methanol, acetonitrile, de-ionized water, or combinations thereof. In some embodiments, a pH of the slurry may be between about 5 and 12 to promote stability of the slurry. In some embodiments, a particle concentration in the slurry of about 10 wt % to about 50 wt % may be utilized to maintain low viscosity while maximizing flowability. In some embodiments, a mass-median-diameter (D50) of the particles in the slurry, which is the average particle diameter by mass, may be between about 10 nanometers and 10 micrometers. In some embodiments, the slurry may include a dispersant to help uniformly distribute the particles. Exemplary dispersants may include low molecular weight polymers, such as polyacrylic acid, ammonium polymethacrylate, omega-3 fatty acids (e.g., eicosapentaenoic acid and docosahexaenoic acid), and polyethylene glycol. In some embodiments, the particles may have compositions that include one or more of $Er_2O_3$, $Gd_2O_3$, $Gd_3Al_5O_{12}$, $La_2O_3$, YAG, $YF_3$, $Nd_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, or $NdAlO_3$.

The plasma plume 214 can reach temperatures between about 3000° C. to about 10000° C. The intense temperature experienced by the slurry (or slurries) when injected into the plasma plume 214 may cause the slurry solvent to evaporate quickly and may melt the ceramic particles, generating a particle stream 216 that is propelled toward the substrate 220. Upon impact with the substrate 220, the molten particles may flatten and rapidly solidify on the substrate, forming a ceramic coating 218. The solvent may be completely evaporated prior to the ceramic particles reaching the substrate 220.

The parameters that can affect the thickness, density, and roughness of the ceramic coating include the slurry conditions, the particle size distribution, the slurry feed rate, the plasma gas composition, the gas flow rate, the energy input, the spray distance, and substrate cooling.

Figure 3A:
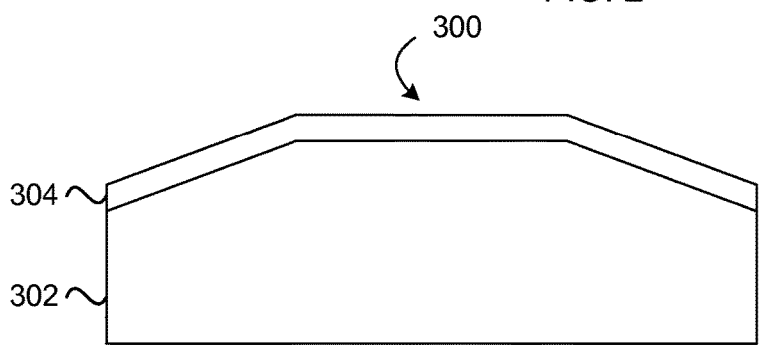
FIGS. 3A and 3B depict a sectional view of an exemplary chamber component with one and two coatings, respectively, according to an embodiment.
Figure 3B:
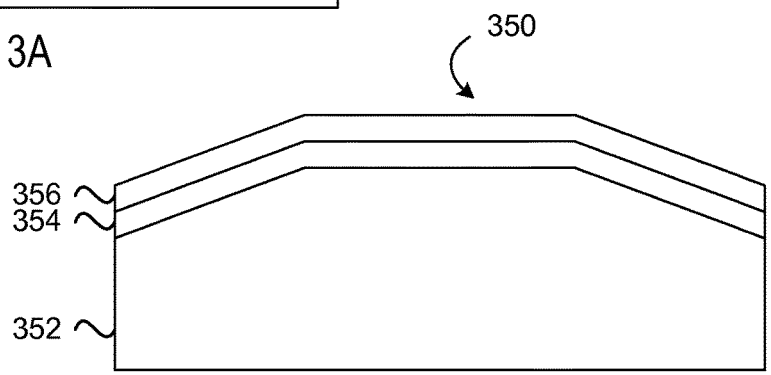

FIGS. 3A and 3B depict a sectional view of an exemplary chamber component with one and two coatings, respectively, according to an embodiment. Referring to FIG. 3A, at least a portion of a base or body 302 of an article 300 is coated by a ceramic coating 304. The article 300 (also referred to generally as a "substrate", which may be the same as the substrate 220 described with respect to FIG. 2) may be a chamber component, such as a substrate support assembly, an electrostatic chuck (ESC), a ring (e.g., a process kit ring or single ring), a chamber liner, a showerhead base, a gas distribution plate, a liner, a liner kit, a shield, a plasma screen, a flow equalizer, a cooling base, a chamber viewport, a chamber lid, and so on. The body 302 of the article 300 may be a metal, a ceramic, a metal-ceramic composite, a polymer, or a polymer-ceramic composite.

Various chamber components are composed of different materials. For example, an electrostatic chuck may be composed of a ceramic such as $Al_2O_3$ (alumina), AlN (aluminum nitride), TiO (titanium oxide), TiN (titanium nitride) or SiC (silicon carbide) bonded to an anodized aluminum base. $Al_2O_3$, AlN and anodized aluminum have poor plasma erosion resistance. When exposed to a plasma environment with a fluorine chemistry and/or reducing chemistry, an electrostatic puck of an electrostatic chuck may exhibit degraded wafer chucking, increased helium leakage rate, wafer front-side and back-side particle production and on-wafer metal contamination after about 50 radio frequency hours (RFHrs) of processing. A radio frequency hour is an hour of processing.

A lid for a plasma etcher used for conductor etch processes may be a sintered ceramic such as $Al_2O_3$ since $Al_2O_3$ has a high flexural strength and high thermal conductivity. However, $Al_2O_3$ exposed to fluorine chemistries forms AlF particles as well as aluminum metal contamination on wafers. Some chamber lids have a thick film protective layer on a plasma facing side to minimize particle generation and metal contamination and to prolong the life of the lid. However, most thick film coating techniques inherent cracks and pores that might degrade on-wafer defect performance.

A process kit ring and a single ring may be used to seal and/or protect other chamber components, and are typically manufactured from quartz or silicon. These rings may be disposed around a supported substrate (e.g., a wafer) to ensure a uniform plasma density (and thus uniform etching). However, quartz and silicon have very high erosion rates under various etch chemistries (e.g., plasma etch chemistries). Additionally, such rings may cause particle contamination when exposed to plasma chemistries. The process kit ring and single ring may also consist of sintered ceramics such as YAG and or a ceramic compound composed of $Y_4Al_2O_9$ and a solid-solution of $Y_2O_3$—$ZrO_2$.

The showerhead for an etcher used to perform dielectric etch processes is typically made of anodized aluminum bonded to a SiC faceplate. When such a showerhead is exposed to plasma chemistries including fluorine, AlF may form due to plasma interaction with the anodized aluminum base. Additionally, a high erosion rate of the anodized aluminum base may lead to arcing and ultimately reduce a mean time between cleaning for the showerhead.

A chamber viewport (also known as an endpoint window) is a transparent component typically made of quartz or sapphire. Various optical sensors may be protected by the viewport, and may make optical sensor readings through the viewport. Additionally, a viewport may enable a user to visually inspect or view wafers during processing. Both quartz and sapphire have poor plasma erosion resistance. As the plasma chemistry erodes and roughens the viewport, the optical properties of the viewport change. For example, the viewport may become cloudy and/or an optical signal passing through the viewport may become skewed. This may impair an ability of the optical sensors to collect accurate readings. However, thick film protective layers may be inappropriate for use on the viewport because these coatings may occlude the viewport.

The examples provided above set forth just a few chamber components whose performance may be improved by use of a thin film protective layer as set forth in embodiments herein.

Referring back to FIG. 3A, a body 302 of the article 300 may include one or more surface features. For an electrostatic chuck, surface features may include mesas, sealing bands, gas channels, helium holes, and so forth. For a showerhead, surface features may include a bond line, hundreds or thousands of holes for gas distribution, divots or bumps around gas distribution holes, and so forth. Other chamber components may have other surface features.

The ceramic coating 304 formed on the body 302 may conform to the surface features of the body 302. As shown, the ceramic coating 304 maintains a relative shape of the upper surface of the body 302 (e.g., telegraphing the shapes of the mesa). Additionally, the ceramic coating may be thin enough so as not to plug holes in the showerhead or helium holes in the electrostatic chuck. In one embodiment, the ceramic coating 304 has a thickness of below about 20 micrometers. In a further embodiment, the ceramic coating 304 has a thickness of between about 10 micrometers to about 500 micrometers. The ceramic coating 304 may be deposited on the body 302 using the plasma spray device 200 described with respect to FIG. 2.

Referring to FIG. 3B, at least a portion of a base or body 352 of an article 350 is coated with two coatings: a first coating 354 and a second coating 356 deposited on the first coating 354. In some embodiments, the first coating 354 may be a coating performed using a standard deposition technique, such as dry plasma spraying of a powder, thermal deposition, sputtering, etc. The first coating 354 may be a ceramic coating, but may have high surface roughness as well as surface defects such as cracks and pores. Accordingly, the second coating 356 may be deposited onto the first coating 354. The second coating may be an SPS deposited ceramic coating using, for example, the plasma spray device 200 described with respect to FIG. 2. In some embodiments, the first and second coating may both be SPS deposited ceramic coatings with different compositions.

The first and second coatings 354, 356 are merely illustrative, and any suitable number of coatings may be deposited on the body 352, forming a coating stack. One or more of the coatings in the coating stack may be a ceramic coating (e.g., an SPS-deposited ceramic coating). The coatings in the coating stack may all have the same thickness, or they may have varying thicknesses. Each of the coatings in the coating stack may have a thickness of less than about 20 micrometers, and about 10 micrometers in some embodiments. In one example, for the two-layer stacking, as depicted in FIG. 3B, the first coating 354 may have a thickness of about 10 micrometers, and the second coating 356 may have a thickness of about 10 micrometers. In another example, first coating 356 may be a YAG layer having a thickness of about 10 micrometers, and the second coating 356 may be an SPS-deposited ceramic coating having a thickness of about 500 micrometers.

Each time the article is heated and cooled, the mismatch in coefficients of thermal expansion between a ceramic coating and the substrate that it coats cause stress on ceramic coating. Such stress may be concentrated at the vertical cracks. This may cause the ceramic coating to eventually peel away from the substrate that it coats. In contrast, if there are not vertical cracks, then the stress is approximately evenly distributed across the thin film. Accordingly, in one embodiment the first coating 354 is an amorphous ceramic such as YAG or EAG, and the second coating 356 is a crystalline or nano-crystalline ceramic such as the ceramic compound or $Er_2O_3$, in which one or more of the coatings are SPS-deposited coatings. In such an embodiment, the second coating 356 may provide greater plasma resistance as compared to the first coating 354. By forming the second coating 356 over the first coating 354 rather than directly over the body 352, the first coating 354 acts as a buffer to minimize lattice mismatch on the subsequent coating. Thus, a lifetime of the second coating 356 may be increased.

In another example, each of the body, $Y_3Al_5O_{12}$, $Y_4Al_2O_9$, $Er_2O_3$, $Gd_2O_3$, $Er_3Al_5O_{12}$, $Gd_3Al_5O_{12}$, and the ceramic compound composed of $Y_4Al_2O_9$ and a solid-solution of $Y_2O_3$—$ZrO_2$ may have a different coefficient of thermal expansion. The greater the mismatch in the coefficient of thermal expansion between two adjacent materials, the greater the likelihood that one of those materials will eventually crack, peel away, or otherwise lose its bond to the other material. The first and second coatings 354, 356 may be formed in such a way to minimize mismatch of the coefficient of thermal expansion between adjacent coatings (or between the first coating 354 and the body 352). For example, the body 352 may be alumina, and EAG may have a coefficient of thermal expansion that is closest to that of alumina, followed by the coefficient of thermal expansion for YAG, followed by the coefficient of thermal expansion for an additional compound ceramic coating. Accordingly, first coating 354 may be EAG, the second coating 356 may be YAG, and an additional coating may be the compound ceramic in one embodiment.

In another example, the coatings in the coating stack may be alternating layers of two different ceramics. For example, a first and third coating may be YAG, and a second and fourth coating may be the compound ceramic. Such alternating coatings may provide advantages similar to those set forth above in cases where one material used in the alternating coatings is amorphous and the other material used in the alternating coatings is crystalline or nano-crystalline.

In some embodiments, one of more of the coatings in the coating stack are transition layers formed using a heat treatment. If the body 352 is a ceramic body, then a high temperature heat treatment may be performed to promote interdiffusion between a ceramic coating (e.g., ceramic coating 354) and the body 352. Additionally, the heat treatment may be performed to promote interdiffusion between adjacent coatings or between a thick coating and a thin coating. The transition layer may be a non-porous layer, may act as a diffusion bond between two ceramics, and may provide improved adhesion between the adjacent ceramic coatings. This may help prevent a ceramic coating from cracking, peeling off, or stripping off during plasma processing.

The thermal treatment may be a heat treatment at up to about 1200-2000° C. at a ramp rate of 0.5-5° C./minute for a duration of up to 1-12 hours. The cool down can be controlled at a rate of 0.5-5° C./minute or can be a natural cool down under ambient conditions. This is may create an inter-diffusion layer between a first ceramic coating and one or more of an adjacent ceramic body or a second ceramic coating. For example, if the ceramic body is $Al_2O_3$, and the ceramic coating is composed of a compound ceramic $Y_4Al_2O_9$ and a solid solution $Y_2\text{-}xZr_xO_3(Y_2O_3\text{—}ZrO_2$ solid solution), then a $Y_3Al_5O_{12}$ interface layer will be formed. Similarly, a heat treatment will cause a transition layer of EAG to form between $Er_2O_3$ and $Al_2O_3$. A heat treatment will also cause a transition layer of YAG to form between $Y_2O_3$ and $Al_2O_3$. A heat treatment may also cause GAG to form between $Gd_2O_3$ and $Al_2O_3$. A heat treatment of yttria stabilized zirconia (YSZ) over $Al_2O_3$ can form a transition layer of the compound ceramic of $Y_4Al_2O_9$ and a solid solution $Y_2\text{-}xZr_xO_3$. Other transition layers may be formed between other adjacent ceramic coatings.

By performing SPS deposition using a slurry of ceramic particles, in accordance with the embodiments described herein, examples of ceramic coating compositions may include $Y_3Al_5O_{12}$, $Y_4Al_2O_9$, $Er_2O_3$, $Gd_2O_3$, $La_2O_3$, YAG, $Er_3Al_5O_{12}$, $Gd_3Al_5O_{12}$, a ceramic compound composed of $Y_4Al_2O_9$ and a solid-solution of $Y_2O_3\text{—}ZrO_2$ ($Y_2O_3\text{—}ZrO_2$ solid solution), or any of the other ceramic materials previously identified. Other Er based and/or Gd based plasma resistant rare earth oxides may also be used to form the ceramic coatings (e.g., coatings 218, 304, 354, and/or 356).

The SPS-deposited ceramic coatings may also be based on a solid solution formed by any of the aforementioned ceramics. With reference to the ceramic compound composed of $Y_4Al_2O_9$ and a solid-solution of $Y_2O_3\text{—}ZrO_2$, in one embodiment, the ceramic compound includes 62.93 molar ratio (mol %) $Y_2O_3$, 23.23 mol % $ZrO_2$ and 13.94 mol % $Al_2O_3$. In another embodiment, the ceramic compound can include $Y_2O_3$ in a range of 50-75 mol %, $ZrO_2$ in a range of 10-30 mol % and $Al_2O_3$ in a range of 10-30 mol %. In another embodiment, the ceramic compound can include $Y_2O_3$ in a range of 40-100 mol %, $ZrO_2$ in a range of 0-60 mol % and $Al_2O_3$ in a range of 0-10 mol %. In another embodiment, the ceramic compound can include $Y_2O_3$ in a range of 40-60 mol %, $ZrO_2$ in a range of 30-50 mol % and $Al_2O_3$ in a range of 10-20 mol %. In another embodiment, the ceramic compound can include $Y_2O_3$ in a range of 40-50 mol %, $ZrO_2$ in a range of 20-40 mol % and $Al_2O_3$ in a range of 20-40 mol %. In another embodiment, the ceramic compound can include $Y_2O_3$ in a range of 70-90 mol %, $ZrO_2$ in a range of 0-20 mol % and $Al_2O_3$ in a range of 10-20 mol %. In another embodiment, the ceramic compound can include $Y_2O_3$ in a range of 60-80 mol %, $ZrO_2$ in a range of 0-10 mol % and $Al_2O_3$ in a range of 20-40 mol %. In another embodiment, the ceramic compound can include $Y_2O_3$ in a range of 40-60 mol %, $ZrO_2$ in a range of 0-20 mol % and $Al_2O_3$ in a range of 30-40 mol %. In another embodiment, the ceramic compound can include $Y_2O_3$ in a range of 30-60 mol %, $ZrO_2$ in a range of 0-20 mol % and $Al_2O_3$ in a range of 30-60 mol %. In another embodiment, the ceramic compound can include $Y_2O_3$ in a range of 20-40 mol %, $ZrO_2$ in a range of 20-80 mol % and $Al_2O_3$ in a range of 0-60 mol %. In other embodiments, other distributions may also be used for the ceramic compound.

In one embodiment, an alternative ceramic compound that includes a combination of $Y_2O_3$, $ZrO_2$, $Er_2O_3$, $Gd_2O_3$ and $SiO_2$ is used for the ceramic coating. In one embodiment, the alternative ceramic compound can include $Y_2O_3$ in a range of 40-45 mol %, $ZrO_2$ in a range of 0-10 mol %, $Er_2O_3$ in a range of 35-40 mol %, $Gd_2O_3$ in a range of 5-10 mol % and SiO2 in a range of 5-15 mol %. In another embodiment, the alternative ceramic compound can include $Y_2O_3$ in a range of 30-60 mol %, $ZrO_2$ in a range of 0-20 mol %, $Er_2O_3$ in a range of 20-50 mol %, $Gd_2O_3$ in a range of 0-10 mol % and SiO2 in a range of 0-30 mol %. In another embodiment, the alternative ceramic compound can include $Y_2O_3$ in a range of 30-45 mol %, $ZrO_2$ in a range of 5-15% mol %, $Er_2O_3$ in a range of 25-60 mol % and $Gd_2O_3$ in a range of 0-25 mol %. In a first example, the alternative ceramic compound includes 40 mol % $Y_2O_3$, 5 mol % $ZrO_2$, 35 mol % $Er_2O_3$, 5 mol % $Gd_2O_3$ and 15 mol % $SiO_2$. In a second example, the alternative ceramic compound includes 45 mol % $Y_2O_3$, 5 mol % $ZrO_2$, 35 mol % $Er_2O_3$, 10 mol % $Gd_2O_3$ and 5 mol % $SiO_2$. In a third example, the alternative ceramic compound includes 40 mol % $Y_2O_3$, 5 mol % $ZrO_2$, 40 mol % $Er_2O_3$, 7 mol % $Gd_2O_3$ and 8 mol % $SiO_2$. In one embodiment, the ceramic coating includes $Y_2O_3$ in a range of 70-75 mol % and $ZrO_2$ in a range of 25-30 mol %. In a further embodiment, the ceramic coating is a material entitled YZ20 that includes 73.13 mol % $Y_2O_3$ and 26.87 mol % $ZrO_2$. In a further embodiment, the ceramic coating is a material entitled YEZ08 that includes 37 mol % $Y_2O_3$, 8 mol % $ZrO_2$ and 55 mol % $Er_2O_3$. In a further embodiment, the ceramic coating is a material entitled YEZG10 that includes 40 mol % $Y_2O_3$, 10 mol % $ZrO_2$, 30 mol % $Er_2O_3$ and 20 mol % $Gd_2O_3$.

Any of the aforementioned ceramic coatings may include trace amounts of other materials such as $ZrO_2$, $Al_2O_3$, $SiO_2$, $B_2O_3$, $Er_2O_3$, $Nd_2O_3$, $Nb_2O_5$, $CeO_2$, $Sm_2O_3$, $Yb_2O_3$, or other oxides. In one embodiment, the same ceramic material is not used for two adjacent ceramic coatings. However, in another embodiment adjacent coatings may be composed of the same ceramic.

Reference is now made to FIGS. 4 and 5 to demonstrate the differences in preparing a ceramic coating using conventional plasma spray deposition with a dry powder and slurry plasma spray deposition of a slurry, respectively.

Figure 4A:
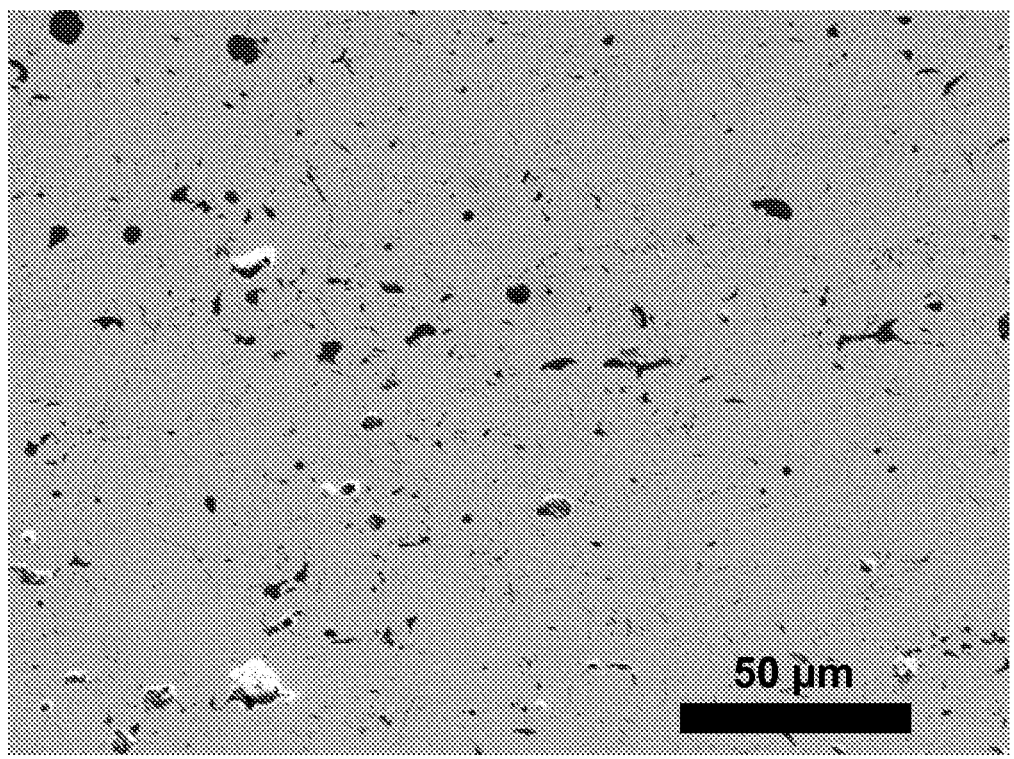
FIG. 4A is a micrograph of a plasma sprayed coating.
Figure 4B:
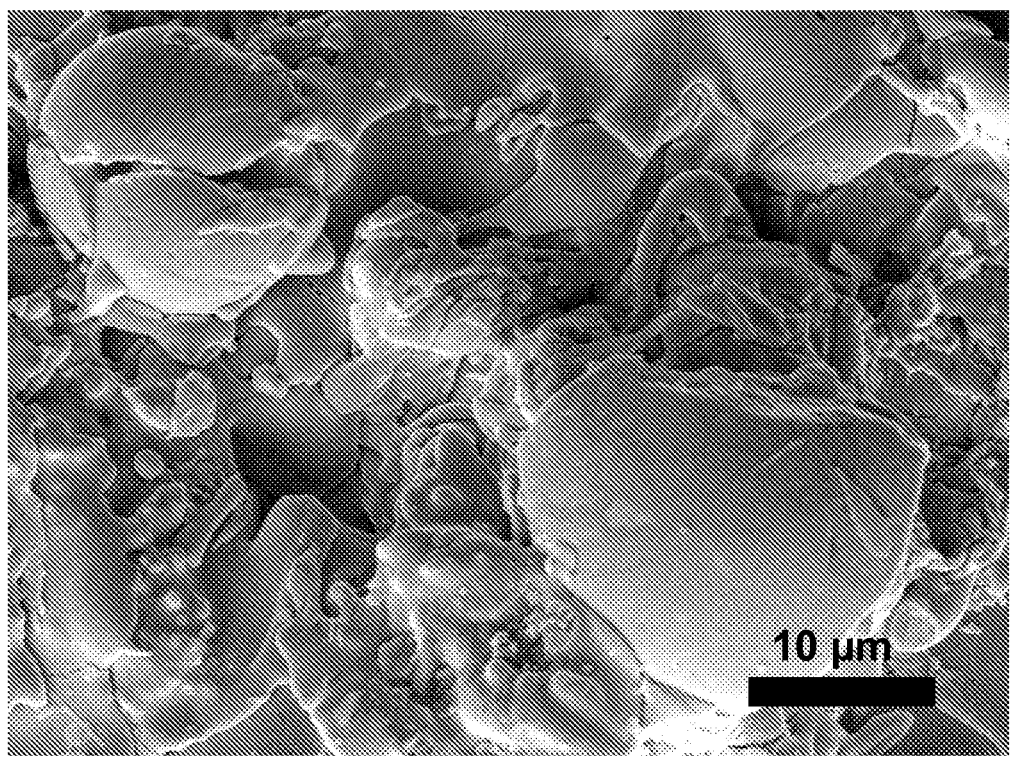
FIG. 4B is another micrograph of a plasma sprayed coating.
Figure 5A:
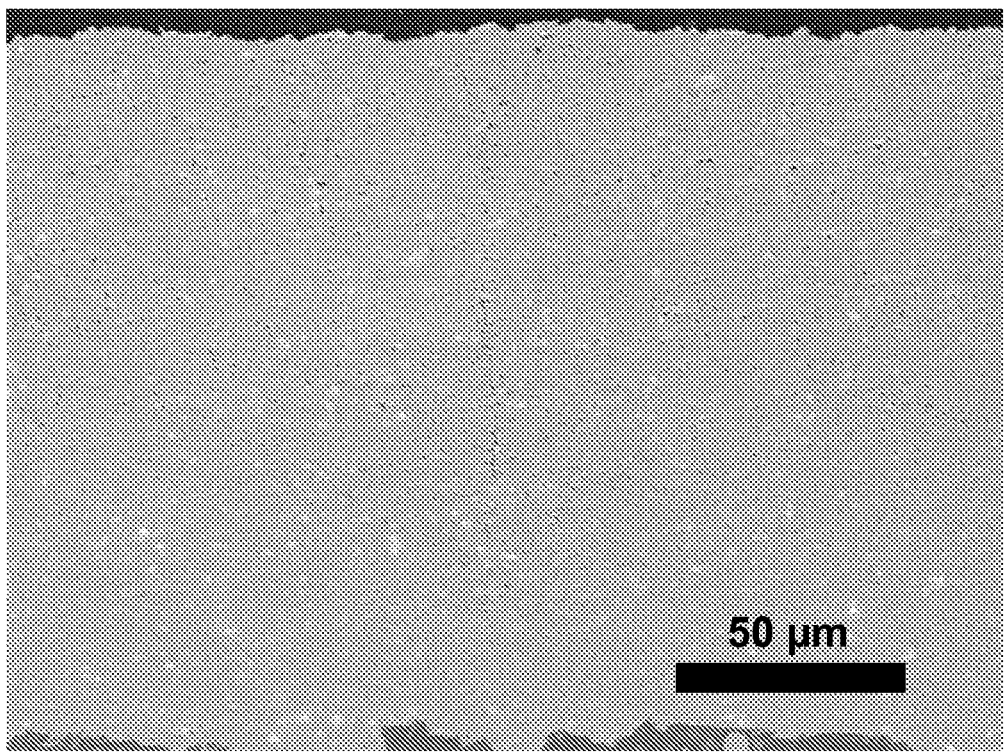
FIG. 5A is a micrograph of a slurry plasma sprayed coating according to an embodiment.
Figure 5B:
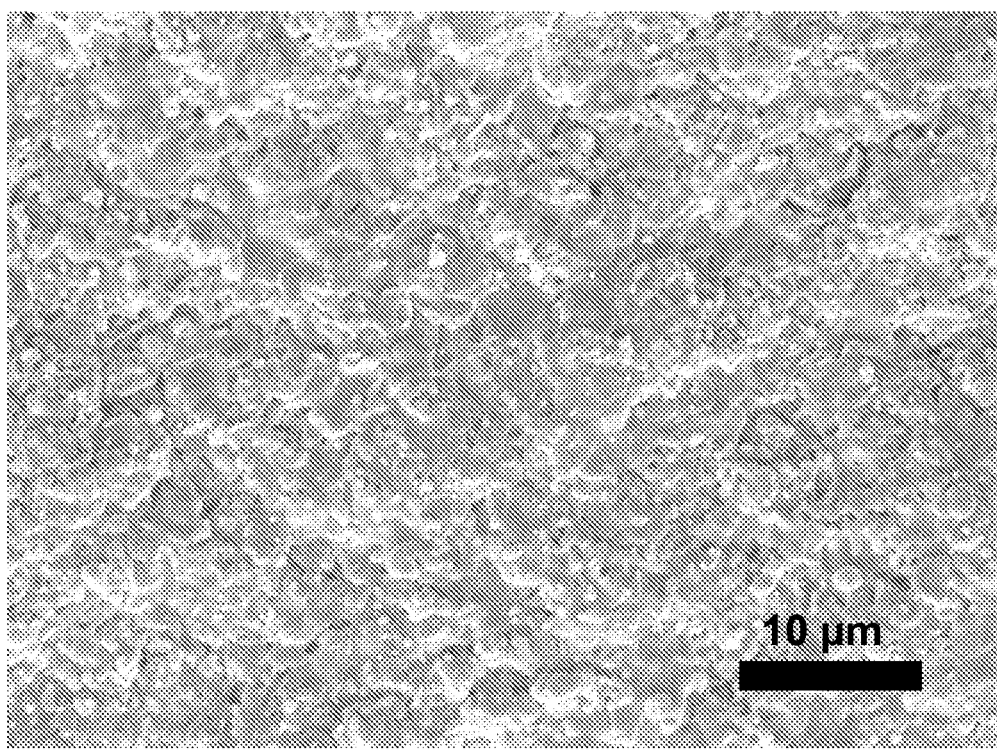
FIG. 5B is another micrograph of a slurry plasma sprayed coating according to an embodiment.

FIGS. 4A and 4B are micrographs of a plasma sprayed coating prepared by plasma spraying a dry powder of $Y_2O_3$ ("dry plasma spraying"), which show the same $Y_2O_3$ coating at different magnifications. FIGS. 5A and 5B are micrographs of a slurry plasma spray coating prepared by plasma spraying a $Y_2O_3$ slurry according to an embodiment, which show the same $Y_2O_3$ coating at different magnifications. Table 1 illustrates the improved properties of the SPS-deposited coating of FIGS. 5A and 5B over the dry plasma sprayed coating of FIGS. 4A and 4B, in terms of surface roughness, porosity, and corrosion resistance (e.g., HCl bubble time).

TABLE 1

Comparison of Dry Plasma Spraying Versus Slurry Plasma Spraying

| Property | Dry Plasma Sprayed $Y_2O_3$ | Slurry Plasma Sprayed $Y_2O_3$ |
|---|---|---|
| Roughness (in µin) | up to 270 | less than 100 |
| Porosity (in %) | 3-5 | less than 0.8 |
| HCl Bubble Time (in hours) | up to 4 | at least 8 |

The dry plasma sprayed coating of FIGS. 4A and 4B is highly porous and contains defects that expose the underlying substrate, while the solution sprayed coating of FIGS. 5A and 5B is less porous and has minimal defects. In some embodiments, an SPS-deposited coating, such as that of FIGS. 5A and 5B, may be deposited on a substrate having a dry plasma sprayed coating, such as that of FIGS. 4A and 4B, to mask the defects and ultimately provide a smoother ceramic coating.

FIG. 6 is a flow diagram illustrating a process 600 for producing a coating in accordance with an embodiment. At block 602, a substrate is provided. In some embodiments, the substrate is a wafer (e.g., a silicon wafer). In some embodiments, the substrate may be a suitable chamber component as described with respect to FIG. 1. For example, the substrate could be any of, but not limited to, a lid, a nozzle, an electrostatic chuck (e.g., ESC 150), a showerhead (e.g., showerhead 130), a liner (e.g., outer liner 116 or inner liner 118) or liner kit, or a ring (e.g., ring 146).

At block 604, a slurry of ceramic particles is fed into a plasma sprayer. The slurry may be fed into the plasma sprayer (e.g., the plasma spray device 200) using a suitable fluid line (e.g., one or more of the fluid lines 212). The slurry may contain ceramic particles with compositions of one or more of $Er_2O_3$, $Gd_2O_3$, $Gd_3Al_5O_{12}$, $YF_3$, $Nd_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, or $NdAlO_3$. A D50 of the particles may be between about 10 nanometers and 10 micrometers. The slurry may contain a solvent, such as ethanol, methanol, de-ionized water, acetonitrile, or combinations thereof, and a pH of the slurry may be between 5 and 12. A particle concentration in the slurry may be about 10 wt % to about 50 wt %.

At block 606, the plasma sprayer generates a stream of ceramic particles directed toward the substrate to form a ceramic coating on the substrate. As the slurry enters a plasma plume generated by the plasma sprayer (e.g., plasma plume 214), the solvent is vaporized and a stream of particles (e.g., particle stream 216) is propelled toward a substrate (e.g., substrate 220). Molten ceramic particles that impinge on a surface of the substrate form a ceramic coating on the substrate. A composition of the resultant ceramic coating may be one or more of $Y_3Al_5O_{12}$, $Y_4Al_2O_9$, $Er_2O_3$, $Gd_2O_3$, $Gd_3Al_5O_{12}$ (GAG), $YF_3$, $Nd_2O_3$, $Er_4Al_2O_9$, $Er_3Al_5O_{12}$(EAG), $ErAlO_3$, $Gd_4Al_2O_9$, $GdAlO_3$, $Nd_3Al_5O_{12}$, $Nd_4Al_2O_9$, $NdAlO_3$, or a ceramic compound composed of $Y_4Al_2O_9$ and a solid-solution of $Y_2O_3$—$ZrO_2$.

In some embodiments, a mask may have been placed over the substrate prior to performing SPS deposition. For example, a mask may be placed a short distance from the substrate (e.g., 1-10 mm) that selectively blocks ceramic particles from impinging on certain regions of the substrate. As another example, the mask may be a photoresist layer, which can be stripped later to leave behind features composed of ceramic material on the substrate. The masking may allow for macroscale and microscale ceramic features to be deposited on the substrate. For example, masking the substrate may be used to form mesas on ESC surfaces.

At block 608, the substrate is cooled while the stream of ceramic particles forms the ceramic coating. For example, a cooling fluid line (e.g., a water line) may pass beneath or adjacent to the substrate in order to induce heat exchange between the substrate and the cooling fluid as the stream of hot particles impinge on the substrate. Cooling the substrate may facilitate the formation of a ceramic coating in some embodiments. In other embodiments, block 608 may be omitted entirely.

At block 610, the ceramic coating is heated to a temperature between about 1200° C. and about 2000° C. for about 1 hour to about 12 hours. In some embodiments, block 610 is performed after the plasma spraying is completed. The substrate may be heated in the plasma sprayer chamber (e.g., by heating with a thermal element located adjacent to the substrate) or in a separate heating chamber. Heating the ceramic coating may help to reduce the porosity and surface roughness of the ceramic coating. In some embodiments, block 610 may be omitted entirely.

FIG. 7 is a flow diagram illustrating a process 700 for producing a multilayered coating in accordance with an embodiment. At block 702, a substrate having a first ceramic coating disposed thereon is provided. The first ceramic coating may be a slurry plasma sprayed ceramic coating, or may have been deposited using a different deposition technique. In some embodiments, the substrate may be a suitable chamber component as described with respect to FIG. 1. For example, the substrate could be any of, but not limited to, a lid, a nozzle, an electrostatic chuck (e.g., ESC 150), a showerhead (e.g., showerhead 130), a liner (e.g., outer liner 116 or inner liner 118) or liner kit, or a ring (e.g., ring 146).

At block 704, a slurry of ceramic particles is fed into a plasma sprayer. Block 704 may be the same or similar to block 604 described with respect to FIG. 6.

At block 706, the plasma sprayer generates a stream of ceramic particles directed toward the substrate to form a second ceramic coating on the first ceramic coating. Block 706 may be the same or similar to block 606 described with respect to FIG. 6, and the slurry may be any suitable slurry described herein. In some embodiments, a first porosity of the first ceramic coating is greater than 0.5%, and a second porosity of the second ceramic coating is less than or equal to 0.5%. In some embodiments, a first surface roughness of the first ceramic coating is greater than or equal to 100 µin, and a second surface roughness of the second ceramic coating is less than or equal to 100 µin. In some embodiments, masking (as described with respect to block 606 in FIG. 6) may be used to selectively pattern ceramic features on the first ceramic coating.

In some embodiments, the first and second ceramic coatings have the same compositions. In some embodiments, the first and second ceramic coatings have different compositions. In some embodiments, blocks 704 and 706 may be performed as many times as desired to produce a multilayered coating stack.

At block 708, the substrate is cooled while the stream of ceramic particles forms the second ceramic coating. Block 708 may be performed in a substantially similar fashion as block 608, as described with respect to FIG. 6. In some embodiments, block 708 may be omitted entirely.

At block 710, the ceramic coating is heated to a temperature between about 1200° C. and about 2000° C. for about 1 hour to about 12 hours. Block 710 may be performed in a substantially similar fashion as block 610, as described with respect to FIG. 6. In some embodiments, block 710 may be omitted entirely.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of forming a plasma resistant ceramic coating on a component of a processing chamber, the method comprising:
    feeding a slurry into a plasma sprayer at a flow rate of between about 5 mL/min and about 100 mL/min, wherein the slurry includes ceramic particles comprising at least one of $Gd_3Al_5O_{12}$, $La_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, or $NdAlO_3$, and wherein the slurry further includes a polymer dispersant that is configured to facilitate uniform distribution of the ceramic particles; and
    generating, with the plasma sprayer, a stream of the ceramic particles directed toward the component, wherein the stream of the ceramic particles forms the plasma resistant ceramic coating on the component upon contact with the component, wherein the plasma resistant ceramic coating comprises at least one of $Gd_3Al_5O_{12}$, $La_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, or $NdAlO_3$.

2. The method of claim 1, wherein the stream of the ceramic particles is generated by evaporating a solvent from the slurry upon passing the slurry through the plasma sprayer, and wherein the solvent comprises at least one of ethanol, methanol, de-ionized water, or acetonitrile.

3. The method of claim 1, wherein the component comprises a ceramic, the method further comprising:
    after forming the plasma resistant ceramic coating, heating the plasma resistant ceramic coating to a temperature up to about 2000° C.;
    heat treating the component and the plasma resistant ceramic coating at the temperature of up to about 2000° C. for a time duration up to about 12 hours; and
    forming a transition layer between the plasma resistant ceramic coating and the component via the heat treating.

4. The method of claim 1, wherein a size of the ceramic particles is up to 15 micrometers.

5. The method of claim 1, wherein a pH of the slurry is between 5 and 12.

6. The method of claim 1, wherein a thickness of the plasma resistant ceramic coating is about 10-500 micrometers, a surface roughness of the plasma resistant ceramic coating is less than about 100 µin, and a porosity of the plasma resistant ceramic coating is less than about 0.8%.

7. The method of claim 1, wherein the component is selected from a group comprising a lid, a nozzle, a chuck, a showerhead, a liner kit, or a ring.

8. The method of claim 1, wherein the component comprises an additional ceramic coating disposed thereon, wherein the plasma resistant ceramic coating is formed over the additional ceramic coating, and wherein the additional ceramic coating is configured to minimize lattice mismatch with the plasma resistant ceramic coating.

9. The method of claim 8, wherein:
    a first porosity of the additional ceramic coating is greater than 0.8%, and a second porosity of the plasma resistant ceramic coating is less than or equal to 0.8%; and
    a first surface roughness of the additional ceramic coating is greater than 100 µin, and a second surface roughness of the plasma resistant ceramic coating is less than or equal to 100 µin.

10. The method of claim 1, further comprising:
    generating, with the plasma sprayer, additional streams of ceramic particles to form a stack of ceramic layers on the component, the stack of ceramic layers comprising the plasma resistant ceramic coating.

11. The method of claim 10, wherein the stack of ceramic layers comprises alternating layers of two different ceramic compounds selected from $Gd_3Al_5O_{12}$, $La_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, and $NdAlO_3$.

12. The method of claim 1, wherein the ceramic particles comprise at least one of $Gd_3Al_5O_{12}$, $GdAlO_3$ or $Gd_4Al_2O_9$.

13. The method of claim 1, wherein the ceramic particles comprise $La_2O_3$.

14. The method of claim 1, wherein the ceramic particles comprise at least one of $Er_4Al_2O_9$ or $ErAlO_3$.

15. The method of claim 1, wherein the ceramic particles comprise $Er_3Al_5O_{12}$.

16. The method of claim 1, wherein the ceramic particles comprise $Nd_3Al_5O_{12}$, $Nd_4Al_2O_9$, or $NdAlO_3$.

17. A method of forming a plasma resistant ceramic coating on a component of a processing chamber, the component having an amorphous ceramic coating formed thereon, the method comprising:

feeding a slurry into a plasma sprayer at a flow rate of about 5 mL/min to about 100 mL/min, wherein the slurry includes ceramic particles comprising at least one of $Gd_2O_3$, $Gd_3Al_5O_{12}$, $La_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, or $NdAlO_3$; and generating, with the plasma sprayer, a stream of the ceramic particles directed toward the component and the amorphous ceramic coating, wherein the stream of the ceramic particles forms the plasma resistant ceramic coating on the component upon contact with the component, wherein a thickness of the plasma resistant ceramic coating is about 10 micrometers to about 500 micrometers, and wherein the plasma resistant ceramic coating comprises at least one of $Gd_2O_3$, $Gd_3Al_5O_{12}$, $La_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, or $NdAlO_3$, wherein the amorphous ceramic coating is configured to minimize lattice mismatch with the plasma resistant ceramic coating, and wherein the plasma resistant ceramic coating is a crystalline coating.

18. The method of claim 8, further comprising:

performing plasma spraying using a dry powder feedstock to deposit the additional ceramic coating on the component prior to deposition of the plasma resistant ceramic coating.

19. The method of claim 8, wherein the plasma resistant ceramic coating is a crystalline coating, and wherein the additional ceramic coating is an amorphous coating.

20. The method of claim 1, wherein the polymer dispersant comprises at least one of polyacrylic acid, ammonium polymethacrylate, an omega-3 fatty acid, or polyethylene glycol.

* * * * *